(12) United States Patent
Cureton et al.

(10) Patent No.: US 12,704,209 B2
(45) Date of Patent: Aug. 11, 2026

(54) FLEXIBLE PIPE AND A METHOD OF MANUFACTURING A FLEXIBLE PIPE

(71) Applicant: Polyflow LLC, Midland, TX (US)

(72) Inventors: Timothy Lee Cureton, Arvada, CO (US); Jeffrey Kenneth Shorter, Magnolia, TX (US)

(73) Assignee: Polyflow LLC, Midland, TX (US)

( * ) Notice: Subject to any disclaimer, the term of this patent is extended or adjusted under 35 U.S.C. 154(b) by 0 days.

(21) Appl. No.: 18/941,750

(22) Filed: Nov. 8, 2024

(65) Prior Publication Data

US 2026/0132874 A1 May 14, 2026

(51) Int. Cl.

| | |
|---|---|
| ***F16L 11/12*** | (2006.01) |
| ***F16L 11/04*** | (2006.01) |
| ***F16L 11/08*** | (2006.01) |
| ***F16L 33/01*** | (2006.01) |
| ***F16L 33/207*** | (2006.01) |
| ***F16L 33/28*** | (2006.01) |

(52) U.S. Cl.

CPC ............ *F16L 33/01* (2013.01); *F16L 11/081* (2013.01); *F16L 2011/047* (2013.01); *F16L 33/2076* (2013.01); *F16L 33/28* (2013.01)

(58) Field of Classification Search

CPC ........ F16L 11/081; F16L 11/083; F16L 33/01; F16L 33/22; F16L 33/2076; F16L 33/28

See application file for complete search history.

(56) References Cited

U.S. PATENT DOCUMENTS

| | | | | |
|---|---|---|---|---|
| 2,731,279 | A * | 1/1956 | Main, Jr. | F16L 33/01 |
| 2,797,111 | A * | 6/1957 | Thomas | F16L 33/2076 |
| 2,809,056 | A * | 10/1957 | Kaiser | F16L 33/01 |
| 2,940,778 | A * | 6/1960 | Kaiser | F16L 33/01 |
| 3,951,438 | A | 4/1976 | Scales | |
| 3,990,729 | A * | 11/1976 | Szentmihaly | F16L 33/01 |
| 4,775,171 | A * | 10/1988 | Marshall | F16L 33/01 |
| 9,989,183 | B2 * | 6/2018 | Glejbøl | F16L 33/01 |
| 2004/0025953 | A1 | 2/2004 | Fraser et al. | |
| 2004/0036280 | A1 * | 2/2004 | Belcher | F16L 33/01 |
| 2007/0157443 | A1 * | 7/2007 | Baldwin | F16L 33/01 |
| 2013/0133775 | A1 * | 5/2013 | Duncan | F16L 11/083 |
| 2014/0049039 | A1 | 2/2014 | Karabelas et al. | |

(Continued)

FOREIGN PATENT DOCUMENTS

| | | | |
|---|---|---|---|
| CN | 201297464 | Y | 8/2009 |
| CN | 205781550 | U | 12/2016 |
| CN | 207555056 | U | 6/2018 |

(Continued)

*Primary Examiner* — William S. Choi

(74) *Attorney, Agent, or Firm* — E. Eric Mills; Nicholas P. Stadnyk; Maynard Nexsen PC

(57) ABSTRACT

A flexible pipe and a method of manufacturing a flexible pipe, the flexible pipe comprising a pipe body comprising first and second pipe layers. The pipe body delimits a bore for conveying a fluid, e.g., a fluid relating to oil and gas operations or mining operations, along the length thereof and the first pipe layer is disposed radially inward of the second pipe layer. The flexible pipe further comprises an end fitting to which a first end of the pipe body is connected. The end fitting comprises a tubular connector member concentric to the pipe body and disposed intermediate the first and second pipe layers.

19 Claims, 3 Drawing Sheets

(56) References Cited

U.S. PATENT DOCUMENTS

| | | | | |
|---|---|---|---|---|
| 2021/0156498 | A1* | 5/2021 | Dhagat .................. | F16L 33/01 |
| 2021/0156499 | A1* | 5/2021 | Leger ..................... | F16L 33/01 |

FOREIGN PATENT DOCUMENTS

| | | | |
|---|---|---|---|
| CN | 207661240 | U | 7/2018 |
| CN | 208331536 | U | 1/2019 |
| CN | 111578008 | B | 8/2021 |
| EP | 1078196 | B1 | 10/2002 |
| WO | 9958894 | A1 | 11/1999 |
| WO | 2021084240 | A1 | 5/2021 |

* cited by examiner

FLEXIBLE PIPE AND A METHOD OF MANUFACTURING A FLEXIBLE PIPE

TECHNICAL FIELD

The invention relates to a flexible pipe for conveying a fluid relating to oil and gas operations, and/or mining operations, in particular an unbonded reinforced thermoplastic pipe. The invention also relates to a method of manufacturing such a pipe.

BACKGROUND

Unbonded reinforced thermoplastic pipe (RTP) is a flexible, high-performance pipe typically used in oil and gas applications for transporting fluids, including hydrocarbons, water, and gas. Unlike traditional rigid pipelines, RTP comprises multiple layers, each serving a distinct purpose: an inner layer provides fluid containment; a reinforcement layer surrounds the inner layer and resists mechanical loads, including tensile loads and internal pressure; and an outer layer surrounds the reinforcement layer and protects the pipe from external damage and environmental factors. The term "unbonded" refers to the fact that the layers of the pipe are not adhesively, or otherwise, bonded to one another.

To ensure the safe and reliable operation of an RTP system, sections of pipe are joined using end fittings. An end fitting serves as the transition point between adjacent sections of RTP, as well between a section of pipe and other parts of the pipeline or equipment. The principal parts of an end fitting include a stem and a ferrule, both of which are hollow, tubular components, the stem being disposed concentrically within the ferrule so that an annular gap extends therebetween. The stem extends within the bore of the pipe, radially inward of the liner. The stem supports the liner and acts as a conduit for fluids transported through the pipe, and may have sealing grooves to accommodate seals, ensuring a fluid-tight connection between the liner and the fitting. The ferrule extends over the outer layer and provides mechanical grip by clamping down on the layers of the pipe, thereby securing the multiple layers within the fitting. More specifically, the ferrule applies a radially inward force on layers of the RTP upon tightening, e.g., crimping, thereby clamping the layers between the ferrule and the stem, the stem resisting the radial force applied by the ferrule. The clamping prevents the layers from disengaging with the fitting due to internal pressure or axial forces.

It is an object of embodiments of the invention to provide an improved flexible pipe and method of making the same, and/or at least mitigate one or more problems associated with known arrangements.

SUMMARY OF THE INVENTION

According to an aspect of the invention, there is provided a flexible pipe comprising: a pipe body comprising first and second pipe layers, the pipe body delimiting a bore for conveying a fluid along the length thereof and the first pipe layer disposed radially inward of the second pipe layer; and an end fitting to which a first end of the pipe body is connected, the end fitting comprising a tubular connector member (e.g., a stem) concentric to the pipe body and disposed intermediate the first and second pipe layers. This arrangement allows removal of the stem from extending within, or being disposed within, the bore of the pipe compared to prior art arrangements, the stem being separated, and thereby protected, from fluids transported through the pipe by at least the first pipe layer. Consequently, abrasive and/or reactive fluids are inhibited from eroding and/or otherwise damaging the stem and/or the end fitting.

In certain embodiments, the first pipe layer may be polymeric pipe layer providing an impervious liner, and/or the first pipe layer may comprise a polymer, e.g., a thermoplastic polymer. Additionally, or alternatively, the first pipe layer may delimit the bore and therefore separate the tubular connector member from the bore. In certain embodiments, the first pipe layer may separate the tubular connector member from the bore without delimiting the bore, which may be delimited alternatively by a further pipe layer.

In certain embodiments, the second pipe layer may be a composite pipe layer formed of a composite comprising a reinforcement embedded in a thermoplastic matrix material. The second pipe layer may be formed of one or more helically wrapped tapes formed of the composite, and optionally wherein the reinforcement comprises a plurality of metallic wires. Additionally, or alternatively, the reinforcement may comprise aramid fibre and/or glass fibre.

In certain embodiments, the end fitting may comprise a further tubular connector member disposed radially outward of the second pipe layer. The second pipe layer may be clamped between the tubular connector member and the further tubular connector member.

In certain embodiments, the pipe body may comprise a third pipe layer disposed radially outward of second pipe layer. The third pipe layer may be a polymeric pipe layer providing a protective sheath, and/or the third pipe layer may comprise a polymer, e.g., a thermoplastic polymer. The polymeric pipe layer may be provided as one of an extrusion, a helically wrapped tape, and a braided cover.

In certain embodiments, the first pipe layer may extend into the end fitting over a length at least equal to a total length of an innermost surface of the end fitting, the innermost surface provided at least in part by the tubular connector member.

In certain embodiments, the bore has substantially constant diameter along a total length of the pipe body and/or the pipe. Additionally, or alternatively, the pipe may comprise multiple sections, each section comprising a respective pipe body and end fitting. The pipe may be a reinforced thermoplastic pipe for conveying oil and gas field fluids and/or mining fluids.

According to a further aspect of the invention, there is provided a method of manufacturing a flexible pipe, the method comprising: providing a pipe body comprising first and second pipe layers, the pipe body delimiting a bore for conveying a fluid along the length thereof and the first pipe layer disposed radially inward of the second pipe layer; providing an end fitting comprising a tubular connector member; and introducing the tubular connector member intermediate, and concentric to, the first and second pipe layers at a first end of the pipe body to form a connection of the pipe body to the end fitting.

In certain embodiments, introducing the tubular connector member may comprise separating (cause to be moved apart) a length of the second pipe layer from the first pipe layer at the first end of the pipe body and inserting the first pipe layer into the tubular connector member such that the tubular connector member is radially outward of the first pipe layer. The second pipe layer may be formed of one or more helically wrapped tapes and separating the length of the second pipe layer may comprise unwrapping the helically wrapped tapes over the length of the second pipe layer. Introducing the tubular member may comprise wrapping the tapes about the tubular connector member after inserting the first pipe layer into the tubular connector member.

In certain embodiments, the method may comprise securing a free end of the first pipe layer to the end fitting and/or to a corresponding pipe layer of a further pipe.

In certain embodiments, the pipe body may comprise a third pipe layer disposed radially outward of second pipe layer, and introducing the tubular connector member may comprise removing a length of the third pipe layer. Additionally, or alternatively, the end fitting may comprise a further tubular connector member disposed radially outward of the tubular connector member and an annular gap extending therebetween, and the method may comprises clamping the second pipe layer in the annular gap. The second pipe layer may be clamped together with other pipe layers, e.g., the third pipe layer and/or at least one further pipe layer. Clamping the second pipe layer may comprise crimping or swaging the further tubular connector member.

BRIEF DESCRIPTION OF THE DRAWINGS

Embodiments of the invention will now be described, by way of example only, with reference to the accompanying figures, in which.

DETAILED DESCRIPTION OF EMBODIMENTS OF THE INVENTION

Generally, embodiments of the invention have application in oil and gas operations, e.g., for transporting oil and gas field fluids, and/or mining operations, e.g., for transporting abrasive slurries, including tailings, mineral-rich slurries, and other harsh fluids. Other applications are contemplated, including water management, municipal utilities, and chemical processing. Moreover, embodiments of the invention may have particular application as RTP, including unbonded RTP, the properties of which—in particular flexibility, durability, and the ability to handle high pressures—make it an attractive option in various industrial applications. Unlike steel pipes, RTP does not corrode, making it ideal for transporting aggressive chemicals, saline water, and other corrosive substances.

Figure 1:
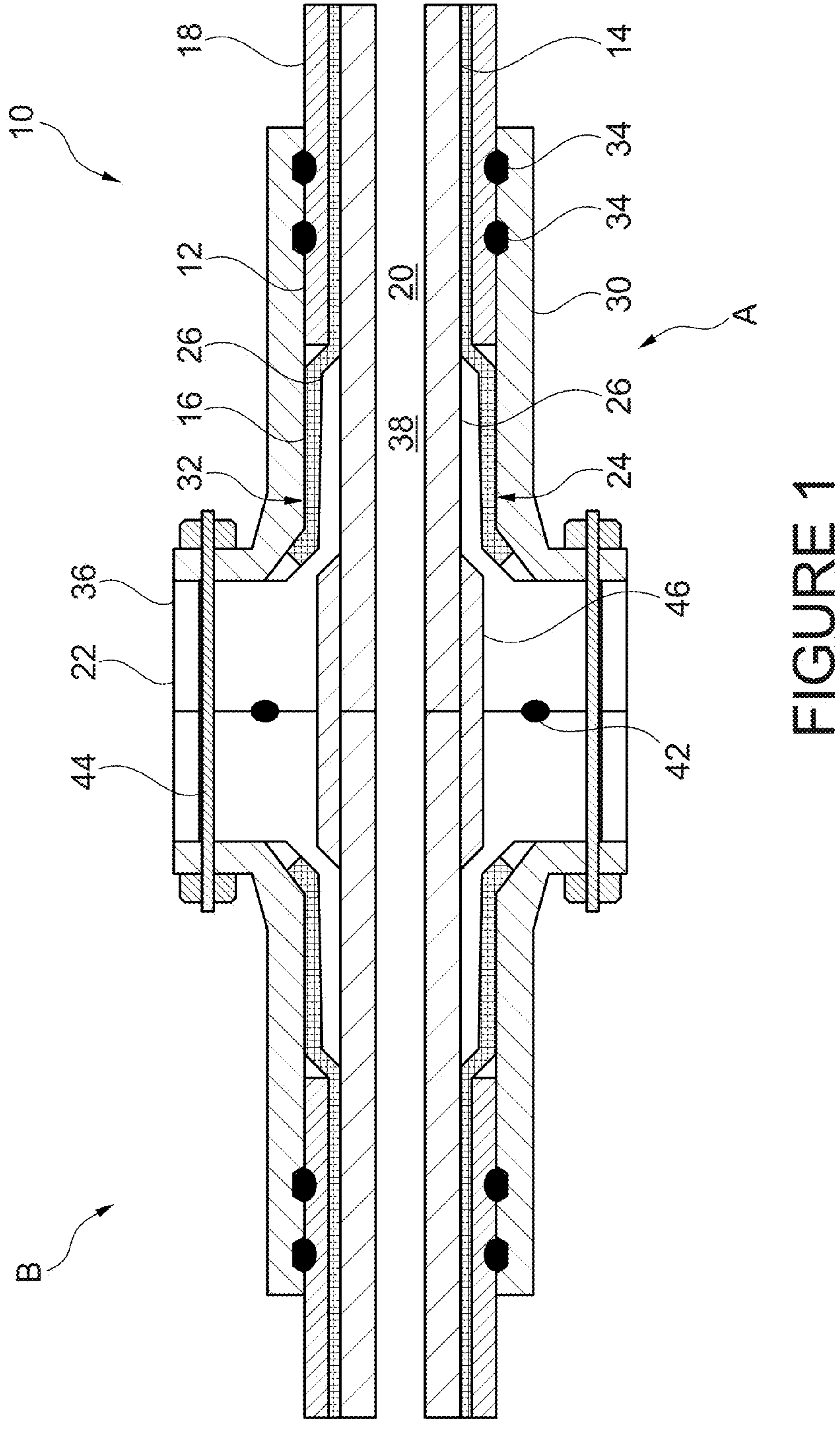
FIG. 1 is a partial cross-sectional view of a flexible pipe according to an embodiment of the invention.

FIG. 1 shows a flexible pipe 10 according to an embodiment of the invention in partial cross-section. The pipe 10 comprises a first section A and a second section B, the first and second sections A, B being connected to one another. As shown in the illustrated embodiment, the first and second sections A, B may be identical to one another. For the purpose of the following description, the first section A will be described. However, it should be understood that the description may apply equally to both of the first and second sections A, B. In certain embodiments, the pipe 10 may comprise only a single section, e.g., the first section A. In certain embodiments, the pipe 10 and/or either of the first and second sections A, B may be connected, or connectable, to equipment such as a wellhead, a processing facility, a pump, or a compressor.

The pipe 10 comprises a pipe body 12 having a first pipe layer 14, a second pipe layer 16 and a third pipe layer 18. The first pipe layer 14 is disposed radially inward of the second pipe layer 16, and the second pipe layer 16 is disposed radially inward of the third pipe layer 18. The first pipe layer 14 may be in direct contact with the second pipe layer 16 and/or the second pipe layer 16 may be in direct contact with the third pipe layer 18, at least over a central length of the pipe body 12. The pipe body 12 delimits a central bore 20 for conveying a fluid, e.g., an abrasive slurry, along the length of the pipe body 12, and hence through or along the pipe 10. In the illustrated embodiment, the first pipe layer 16 delimits the bore 20. The pipe 10 further comprises an end fitting 22, to which a first end 24 of the pipe body 12 is mounted. A second end (not shown) of the pipe body 12 may be mounted, or mountable, to a similar, or an identical, end fitting. The end fitting 22 comprises a first tubular connector member 26, which in the following description is referred to as a stem, which is concentric to the pipe body 12 and disposed intermediate the first and second pipe layers 14, 16.

The position of the stem 26, intermediate the first and second pipe layers 14, 16, means that no part of the end fitting 22 need be within, or exposed to, the central bore 20. The stem 26 may therefore provide a radially innermost surface 28 of the end fitting 22. The first pipe layer 16 may extend into the end fitting 22 over a length at least equal to a total length of the innermost surface 28. The first pipe layer 26 protects the end fitting 22 from fluid flowing through the bore 20 when in use, which fluid may undesirably damage the end fitting 22, e.g., by abrasion or chemical reaction. The first pipe layer 16 may extend through the end fitting 22 such that a total length of the first pipe layer 16 is equal to a total length of the first section A. Moreover, in certain embodiments, the total length of the first pipe layer 14 may be equal to a total length of the pipe 10. Additionally, or alternatively, the first pipe layer 14 may by continuous through the connection formed by the first section A to the second section B, by adjoining, or terminating adjacent to, the corresponding layer of the second section B, as shown in the illustrated embodiment. As shown, the first, second and third pipe layers 14, 16, 18 may therefore not be coterminous with one another, i.e., each may terminate at different axial positions at the first end 24 of the pipe body 12 relative to one another, to facilitate their respective engagement with the end fitting 22. To this end, the first pipe layer 14 may be longer than each of the second and third pipe layers 16, 18. The second and third pipe layers 16, 18 may the same length as, or different lengths to, one another.

Additionally, the position of the stem 26, intermediate the first and second pipe layers 14, 16, means that the stem 26 is disposed radially inward of the first pipe layer 16. The allows for the bore 20 to have a substantially constant diameter along a total length of the pipe 10, or at least through the connection between the first and second sections A, B, since no part of the end fitting 22 need be disposed radially inward of the first pipe layer 14 to affect clamping of the first end 24 of the pipe body 12, as is required in known arrangements. Embodiment of the invention may therefore inhibit increased flow velocity through the connection relative to the pipe body 12 compared to known arrangements, in which narrowing of the bore 20 through the end fittings 22 occurs.

The end fitting 22 has a second tubular connector member 30, which in the following description is referred to as a ferrule. The ferrule 30 is disposed radially outward of the second pipe layer 16, forming an annular gap 32 extending between the stem 26 and the ferrule 30. The stem 26 and the ferrule 30 cooperate with one another to connect the pipe body 12 to the end fitting 22, by clamping the first end 24 of the pipe body 12 in the annular gap 32. In the illustrated embodiment, the first end 24 of the pipe body 12 extends into the end fitting 22, and the second pipe layer 16 extends between the stem 26 and the ferrule 30, i.e., into the annular gap 32. The second pipe layer 16 is clamped between the stem 26 and the ferrule 30, thereby forming a load carrying connection between the pipe body 12, or more specifically the second pipe layer 16, and the end fitting 22. In certain embodiments, the third pipe layer 18 may also be clamped between the stem 26 and ferrule 30. However, as in the illustrated embodiment, this need not be the case, and the third pipe layer 18 may terminate outside of the annular gap 32. The stem 26 and the ferrule 30 may extend axially over the same length as, or different lengths to, one another. Seals 34 may be provided to seal between the pipe body 12 and the end fitting 22.

As in the illustrated embodiment, the end fitting 22 may comprise a body 36 from which the stem 26 extends. A central bore 38 extends through the end fitting 22, and through the stem 26, which is wholly or at least partially lined by the first pipe layer 14. The body 36 provides a sealing, or joining, face 40 for making the connection between the first and second sections A, B. Of course, the connection may be made to other parts of a pipeline. The ferrule 30 fits over the stem 26—with the second pipe layer 16 intermediate the stem 26 and the ferrule 30—and is pressed, e.g., crimped or swaged, to clamp the pipe body 12 against the stem 26. This compression mechanically anchors the pipe body 12 to the end fitting 22.

In certain embodiments, an internal wedge, or collet system, may be provided to enhance the clamping efficacy between the pipe body 12 and the end fitting 22. The sealing face 40 may be provided by a flange, and/or comprise a seal 42. The connection between the first and second section A, B may made by fasteners 44, e.g., bolts or threaded bars, passed through the body 34. The fasteners 44 may also pass through the ferrule 30. The pipe 10 may comprise an insert 46 to ensure continuity of the first pipe layer 14 through the connection, i.e., to ensure separation of the bore 20 from the end fitting 22. The insert 46 may be a tubular and/or polymeric insert. The insert may be made from the same material as the first pipe layer 14. As in the illustrated embodiment, the insert 46 may be a single component incorporated in both of, or shared between, the first and second sections A, B, i.e., the end fitting 22 of the described section and the corresponding end fitting of the adjoining section. Respective electrofusion bonds may connect, and/or seal, the insert 46 to the first pipe layer 14 and the corresponding layer of the adjoining section or pipeline component.

The first, second and third pipe layers 14, 16, 18 may each be made of any suitable material. Either of the first and third pipe layers 14, 18, i.e., one and/or the other, may be a polymeric pipe layer. As such, either of the first and second layer may comprise a polymer, e.g., a thermoplastic polymer. The first pipe layer 14 may provide an impervious liner, or an inner barrier layer, providing resistance to a fluid transported through the pipe 10. Particularly suitable polymers for the first pipe layer 14 include high-density polyethylene (HDPE), polyamide (PA), polyvinylidene fluoride (PVDF), polyethylene of raised temperature resistance (PE-RT), and polyphenylene sulphide (PPS). The third pipe layer 18 may provide a protective sheath, or an outer protective layer, protecting the pipe 10 from external environmental factors, e.g., UV radiation and mechanical damage. Particularly suitable polymers for the second pipe layer 16 include HDPE, polypropylene (PP), and cross-linked polyethylene (PEX). In the case of both the first and third pipe layers 14, 18, other polymers are contemplated, and polymer blends may be used.

The second pipe layer 16 may be a composite pipe layer formed of a composite comprising a reinforcement embedded in a thermoplastic matrix material. The second pipe layer 16 may provide a reinforcement layer to handle mechanical stresses, including internal pressure, and tensile loads acting along the length of the pipe 10. Particularly suitable materials for the reinforcement include steel, aramid fibres, and glass fibres. The reinforcement may be arranged in specific orientations to optimise the strength of the reinforcement in a given direction. Therefore, the reinforcement may be wound helically along the pipe body 12 at a specific angle, e.g., 55° relative to the central axis of the pipe body 12, which balance hoop stress resistance (to contain internal pressure) and axial strength (to withstand tensile loads). The reinforcement is held in place and protected by the thermoplastic matrix material. Particularly suitable polymers for the thermoplastic matrix material include PP, PA, and PPS. In certain embodiments, a tape may be formed of the composite, and the second pipe layer 16 may be formed of one or more of helically wrapped tapes. The helically wrapped tapes may be wrapped having a lay angle of at least 45° and/or up to 90°, and/or at least two of the helically wrapped tapes form respective sub-layers to form the second pipe layer 16.

The end fitting 22 may be made of any suitable material. Particularly suitable material for the fitting include carbon steel, stainless steel, nickel-based alloys, composite materials. Thermoplastics, e.g., PP and PA, may also be used in low pressure applications. As the skilled reader will appreciate, forming the pipe body 12 as illustrated, i.e., comprising three layers: a inner liner layer, a reinforcement layer, and an outer layer, and forming the layers using the materials described above is to make a typical RTP pipe body. As such, the pipe 10 may be an RTP. The RTP may be used for conveying oil and gas field fluids and/or mining fluids.

The first, second and third pipe layers 14, 16, 18 may be any suitable thickness, i.e., radial thickness, depending on the service requirements in a given embodiment. In certain embodiments, the first pipe layer 14 may have a thickness of at least 0.125 inches (~3.18 mm) and/or up to 1.250 inches (~31.75 mm). Additionally, or alternatively, the second pipe layer 16 may have a thickness of at least 0.125 inches (~3.18 mm) and/or up to 0.825 inches (~20.96 mm), and/or the third pipe layer 18 may have a thickness of at least 0.100 inches (~2.54 mm) and/or up to 0.375 inches (~9.525 mm).

The pipe 10 may be manufactured by a method according to an embodiment of the invention. The method comprises providing the pipe body 12, providing the end fitting 22, and introducing the stem 26 intermediate, and concentric to, the first and second pipe layers 14, 16 at the first end 24 of the pipe body 12, in order to form the connection of the pipe body 12 to the end fitting 22. Introducing the stem 26 intermediate the first and second pipe layers 14, 16 comprise preparation, or processing, of one or more of the first, second and third pipe layers 14, 16, 18. In particular, a length of the third pipe layer 18 may be removed from the pipe body 12, e.g., by making a circumferential cut through the thickness of third pipe layer 18 and subsequently pulling, or peeling, the third pipe layer 18 away from the second pipe layer 16. With a length the second pipe layer 16 then exposed, the length of the second pipe layer 18 may be separated from the first pipe layer 14.

How separation of the second pipe layer 16 occurs may depend upon the configuration of the second pipe layer 16, e.g., in embodiments in which the second pipe layer 16 is formed of one or more helically wrapped tapes, separating the length of the second pipe layer 16 may comprise unwrapping the helically wrapped tapes over the length of the second pipe layer 16, to expose a length of the first pipe layer 14. In certain embodiments, the separation may be by making a plurality of axial cuts spaced circumferentially from one another through the thickness of second pipe layer 16 and subsequently pulling, or peeling, the second pipe layer 16 away from the first pipe layer 14. The separated length of the second pipe layer 16 remains connected to the remainder of the second pipe layer 16, to enable effective load transfer after clamping, as described below.

With a length of the second pipe layer 16 separated from the first pipe layer 14, the exposed length of the first pipe layer 14 may be inserted into the stem 26, such that the stem 26 is radially outward of the first pipe layer 14, and/or the first pipe layer 14 is in direct contact with the stem 26. The length of the second pipe layer 16 separated from the first pipe layer 14 may then be brought together with the stem 26, e.g., by wrapping the tapes about the stem 26. The tapes may be wrapped about the stem 26 in a similar, or the same, helical manner in which they were arranged before separation of the second pipe layer 16. The second pipe layer 16 may then be clamped in a conventional manner. The ferrule 30 may be placed over the stem 26 such that the second pipe layer 16 is intermediate the stem 26 and the ferrule 30, i.e. the second pipe layer 16 is disposed in the annular gap 32 between the stem 26 and the ferrule 30. The ferrule 30 is pressed, e.g., crimped or swaged, to clamp the second pipe layer 16 against the stem 26 and thereby effect load transfer between the pipe body 12 and the end fitting 22. A free end of the first pipe layer 14 may be secured to the end fitting 22, the insert 46 and/or to a corresponding pipe layer of a further pipe, e.g., of the second section B. Securement may be by any suitable means, e.g., electrofusion or butt fusion.

In certain embodiments, the insert 46 may be an electrofusion circumferential insert provided at the first end 24 of the pipe body 12 of the first section A, applied over the first pipe layer 14 and fused to the radially outer surface thereof. The insert 46 may extend only to a free end of the first pipe layer 14 of section A and interface an corresponding insert of the second section B. The insert 46 may be covered and supported by the stem 26 and/or the body 36, and may provide angled sealing surfaces against which the stem 26 acts, or a portion of which may be clamped between the stem 26 of the first section A and an corresponding stem of the second section B.

In certain embodiments, the stem 26 and body 36 may be split into two or more circumferential portions to facilitate fitting around the insert 46 and radially inward of the second pipe layer 16. In such embodiments, the insert 46 extends between, and may be fused to, the first pipe layer 14 of the first section A and the corresponding first pipe layer 14 of the second section B, to provide a fluid tight connection or seal between the first and second sections.

It is to be understood that with a butt fusion connection between respective first pipe layers of the first and second sections A, B there may be no need for an insert 46, and the stem 26 and body 36 may provide directly radial support to the butt welded ends of the first pipe layers of the first and second sections A, B.

Figure 2:
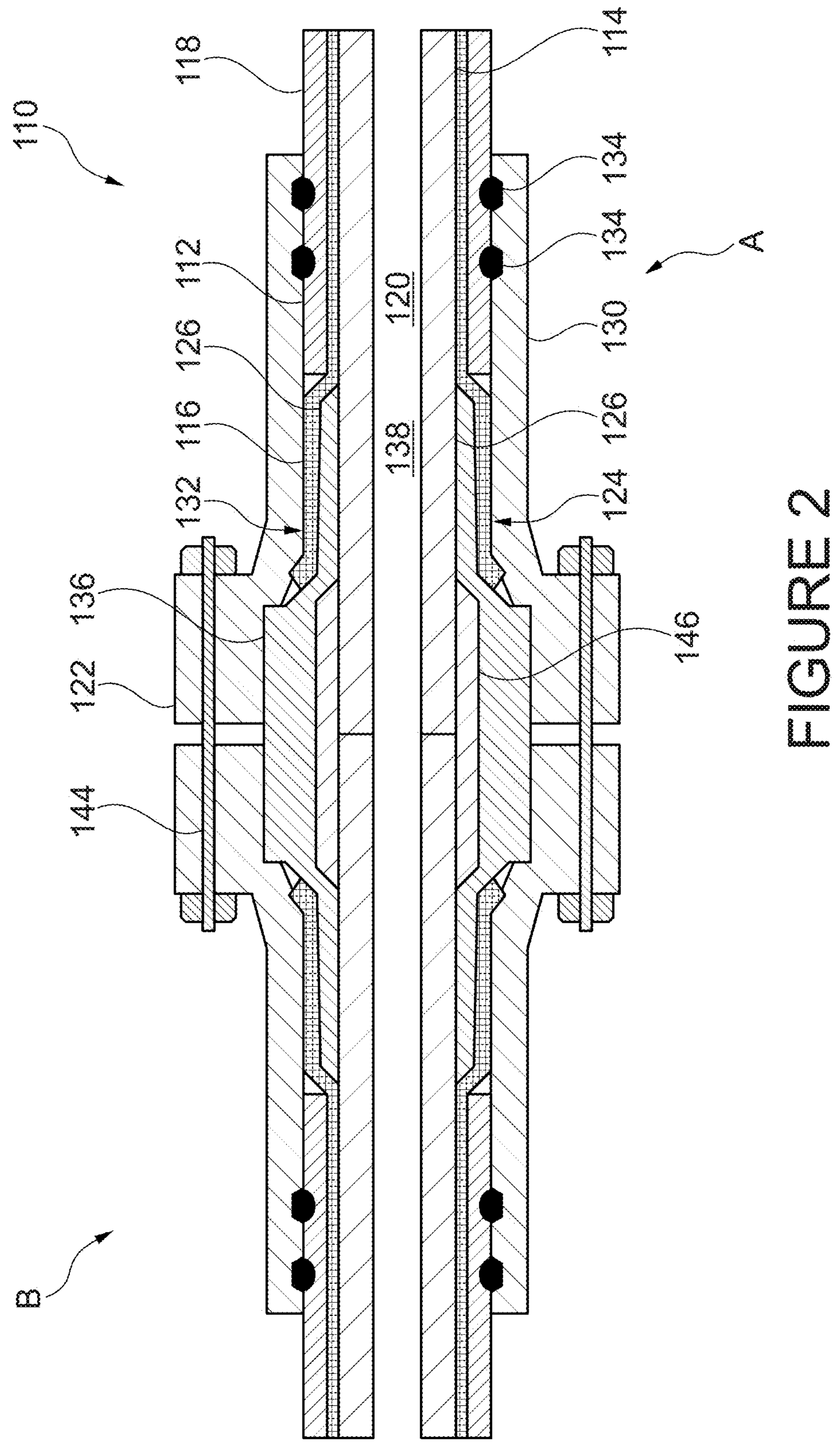
FIG. 2 is a partial cross-sectional view of a flexible pipe according to another embodiment of the invention.

FIG. 2 shows an alternative flexible pipe 110 according to embodiment of the invention in partial cross-section. The same, or at least similar, features as described above in relation to the flexible pipe 10 shown in FIG. 1 are denoted with like reference numerals, offset by a factor of 100. The principal difference of the flexible pipe 110 shown in FIG. 3 over the flexible pipe 10 shown in FIG. 1 is that the end fitting 122 has a different configuration. Specifically, the body 136 of the end fitting 122, from which the stem 126 extends, is formed a single component incorporated in both first and second sections A, B. In the illustrated embodiment, the fasteners 144 pass though the ferrule 130, and not through the body 136. Though this need not be case, and the fasteners may pass through the body 136 also. An electrofusion facilitating insert 146 may be incorporated into the body 136 and thereby may be coupled to free ends of the first pipe layer 14 in the first section A and to the corresponding first pipe layer in the second section B, to provide a continuous fluid tight first pipe layer 14 connection between pipe sections A and B.

Figure 3:
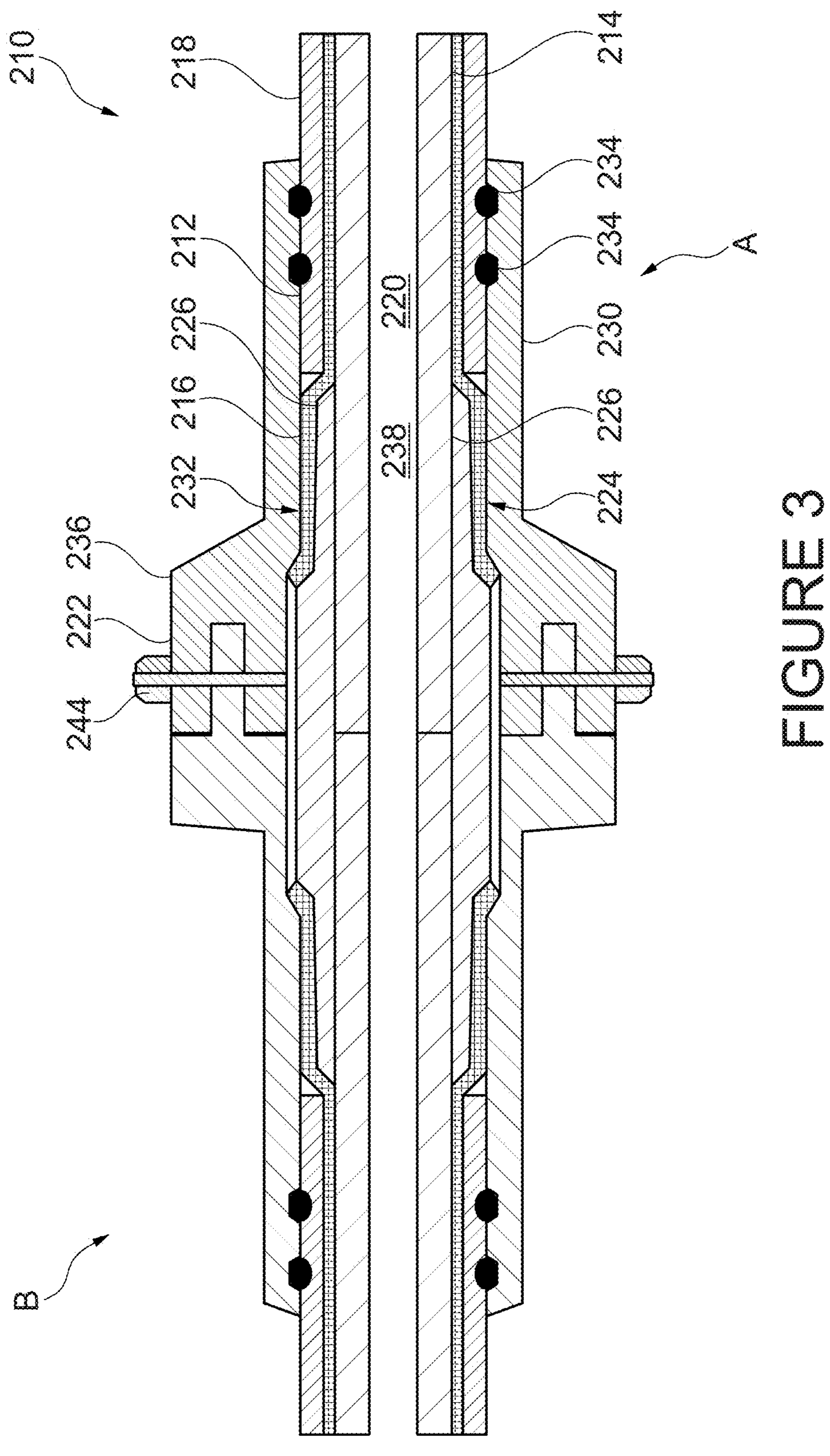
FIG. 3 is a partial cross-sectional view of a flexible pipe according to yet another embodiment of the invention.

FIG. 3 shows a further alternative flexible pipe 210 according to an embodiment of the invention, again in partial cross-section. The same, or at least similar, features as described above in relation to the flexible pipe 10 shown in FIG. 1 are denoted with like reference numerals, offset by a factor of 200. The principal difference of the flexible pipe 210 shown in FIG. 3 over the flexible pipe 10 shown in FIG. 1 is again that the end fitting 222 has a different configuration. Specifically, the body 136 of the end fitting 222 comprises the ferrule 230, and the fasteners 244 pass though the body 136. The stem 226 is formed a single component incorporated in both first and second sections A, B. The illustrated embodiment lacks and insert. In such embodiments, a free end of the first pipe layer 214 may be secured to a corresponding pipe layer of a further pipe, e.g., by electrofusion. A hub may be included in the body 236 so that external clamps may be applied around the connected end fittings 222 to draw the end fittings of the first and second sections A, B together and sealingly secure the pipe layers 14, 16 and 18 therein. An example of such a hub and clamp system is a Vector Techlok® clamp connector.

The invention is not restricted to the details of any foregoing embodiments. In particular, the pipe body 12 may comprise further pipe layers, including a further pipe layer radially inward of the first pipe layer 14. In such embodiments, the further pipe layer may therefore delimit the bore 20. In certain embodiments, clamping may be effected without the ferrule 30, e.g., by hose clamp, or band clamp, type arrangement. The second tubular connector member 30 need not be a ferrule.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, or characteristics described in conjunction with a particular aspect, embodiment or example of the invention are to be understood to be applicable to any other aspect, embodiment or example described herein unless incompatible therewith. In particular, the words "certain embodiments" are to be understood to mean any embodiment described, illustrated, or otherwise disclosed herein, unless expressly stated otherwise. All of the features disclosed in this specification (including any accompanying claims, abstract and drawings), and/or all of the steps of any method or process so disclosed, may be combined in any combination, except combinations where at least some of such features and/or steps are mutually exclusive. The invention extends to any novel one, or any novel combination, of the features disclosed in this specification (including any accompanying claims, abstract and drawings), or to any novel one, or any novel combination, of the steps of any method or process so disclosed.

Attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe comprising:

a pipe body comprising first and second pipe layers, the pipe body delimiting a bore for conveying a fluid along a length thereof and the first pipe layer disposed radially inward of the second pipe layer; and an end fitting to which a first end of the pipe body is connected, the end fitting comprising a tubular connector member concentric to the pipe body and disposed intermediate the first and second pipe layers, wherein the innermost surface of the entire end fitting is provided at least in part by the tubular connector member, and wherein the first pipe layer extends into the end fitting over a length at least equal to the total length of the innermost surface of the entire end fitting.

2. A flexible pipe according to claim 1, wherein the first pipe layer is a polymeric pipe layer providing an impervious liner.

3. A flexible pipe according to claim 1, wherein the first pipe layer delimits the bore and therefore separates the tubular connector member from the bore.

4. A flexible pipe according to claim 1, wherein the second pipe layer is a composite pipe layer formed of a composite comprising a reinforcement embedded in a thermoplastic matrix material.

5. A flexible pipe according to claim 4, wherein the second pipe layer is formed of one or more helically wrapped tapes formed of the composite, and optionally wherein the reinforcement comprises a plurality of metallic wires.

6. A flexible pipe according to claim 1, wherein the end fitting comprises a further tubular connector member disposed radially outward of the second pipe layer.

7. A flexible pipe according to claim 6, wherein the second pipe layer is clamped between the tubular connector member and the further tubular connector member.

8. A flexible pipe according to claim 1, wherein the pipe body comprises a third pipe layer disposed radially outward of second pipe layer.

9. A flexible pipe according to claim 8, wherein the third pipe layer is a polymeric pipe layer providing a protective sheath.

10. A flexible pipe according to claim 1, wherein the bore has substantially constant diameter along a total length of the pipe body.

11. A flexible pipe according to claim 1, wherein the pipe body is a reinforced thermoplastic pipe for conveying oil and gas field fluids and/or mining fluids.

12. A method of manufacturing a flexible pipe, the method comprising:

providing a pipe body comprising first and second pipe layers, the pipe body delimiting a bore for conveying a fluid along the length thereof and the first pipe layer disposed radially inward of the second pipe layer;

providing an end fitting comprising a tubular connector member; and introducing the tubular connector member intermediate, and concentric to, the first and second pipe layers at a first end of the pipe body to form a connection of the pipe body to the end fitting, wherein the innermost surface of the entire end fitting is provided at least in part by the tubular connector member, and wherein the first pipe layer extends into the end fitting over a length at least equal to the total length of the innermost surface of the entire end fitting.

13. A method according to claim 12, wherein introducing the tubular connector member comprises separating a length of the second pipe layer from the first pipe layer at the first end of the pipe body and inserting the first pipe layer into the tubular connector member such that the tubular connector member is radially outward of the first pipe layer.

14. A method according to claim 13, wherein the second pipe layer is formed of one or more helically wrapped tapes and separating the length of the second pipe layer comprises unwrapping the helically wrapped tapes over the length of the second pipe layer.

15. A method according to claim 14, wherein introducing the tubular member comprises wrapping the tapes about the tubular connector member after inserting the first pipe layer into the tubular connector member.

16. A method according to claim 12, wherein the method comprises securing a free end of the first pipe layer to the end fitting and/or to a corresponding pipe layer of a further pipe.

17. A method according to claim 12, wherein the pipe body comprises a third pipe layer disposed radially outward of second pipe layer, and introducing the tubular connector member comprises removing a length of the third pipe layer.

18. A method according to claim 12, wherein the end fitting comprises a further tubular connector member disposed radially outward of the tubular connector member and an annular gap extending therebetween, and the method comprises clamping the second pipe layer in the annular gap.

19. A method according to claim 18, wherein clamping the second pipe layer comprises crimping or swaging the further tubular connector member.

* * * * *